United States Patent [19]

Hazlett et al.

[11] Patent Number: 4,830,108

[45] Date of Patent: May 16, 1989

[54] AMINO RESIN MODIFIED XANTHAN POLYMER FOAMED WITH A CHEMICAL BLOWING AGENT

[75] Inventors: Randy D. Hazlett, Dallas, Tex.; Paul Shu, Princeton Junction, N.J.

[73] Assignee: Mobil Oil Corp., New York, N.Y.

[21] Appl. No.: 140,451

[22] Filed: Jan. 4, 1988

[51] Int. Cl.$^4$ .................. E21B 43/22; E21B 33/138
[52] U.S. Cl. ........................... 166/270; 166/274; 166/295; 166/300
[58] Field of Search ............ 166/270, 273–275, 166/295, 300, 309; 405/264; 523/130

[56] References Cited

U.S. PATENT DOCUMENTS

| | | | |
|---|---|---|---|
| 2,761,511 | 9/1956 | Billue | 166/292 |
| 3,993,133 | 11/1976 | Clampitt | 166/270 X |
| 4,232,741 | 11/1980 | Richardson et al. | 166/305.1 X |
| 4,300,634 | 11/1981 | Clampitt | 166/295 X |
| 4,450,010 | 5/1984 | Burkhalter et al. | 166/293 X |
| 4,590,228 | 5/1986 | Soreau et al. | 166/295 X |
| 4,676,318 | 6/1987 | Myers et al. | 166/292 X |
| 4,694,906 | 9/1987 | Hutchins et al. | 166/294 |
| 4,705,810 | 11/1987 | Millet et al. | 521/97 X |
| 4,716,966 | 1/1988 | Shu | 166/295 |

*Primary Examiner*—George A. Suchfield
*Attorney, Agent, or Firm*—Alexander J. McKillop; Charles J. Speciale; Charles A. Malone

[57] ABSTRACT

A method for reducing the permeability in a desired area of a formation wherein a foamed gel is formed in-situ by injecting a solution into said formation. Said solution comprises a gellable composition including water; a cross linkable polysaccharide biopolymer; an aminoplast resin which reinforces said biopolymer; and sufficient transitional metal ions to form a gel of the desired size and strength. The gelled solution is foamed by including therein a chemical surfactant, and a chemical blowing agent. Once in the formation to the desired depth, the chemical blowing agent decomposes and generates a gas sufficient to foam the gelled solution. The gelled foam stiffens and reduces the permeability in a desired area.

15 Claims, No Drawings

AMINO RESIN MODIFIED XANTHAN POLYMER FOAMED WITH A CHEMICAL BLOWING AGENT

RELATED APPLICATIONS

This application is related to U.S. Ser. No. 922,916 filed on Oct. 24, 1986, which issued as U.S. Pat. No. 4,716,966 on Jan. 5, 1988, and U.S. Ser. No. 07/123,615 filed on Nov. 20, 1987.

FIELD OF THE INVENTION

This invention relates to a method for reducing the permeability of a subterranean formation, for use in miscible gas flooding and waterflooding. More particularly, this invention relates to a method of blocking an area of a subterranean formation by use of a rigid, impermeable foam including an amino resin modified Xanthan polymer, a chemical surfactant, and a chemical blowing agent.

BACKGROUND OF THE INVENTION

Various methoos have been proposed so that injected fluids can be diverted to uncontacted zones of a reservoir. One such method is disclosed in U.S. Pat. No. 2,402,588 issued to Andresen ("Andresen"). Andresen disclosss a method of sealing a more permeable area of a reservoir by injecting into a reservoir a dilute alkaline solution of sodium silicate uncer low pressure. An acid gas such as carbon dioxide is then injected to reduce the alkalinity of the solution, resulting in gelling.

Another method is disclosed in U.S. Pat. No. 3,645,336 issued to Young et al. ("Young"). Young discloses the plugging of a zone of a reservoir by injecting a mixture of steam and socrum silicate into the permeable zone. A second mixture containing steam and a gelling agent such as carbon dioxide is injected in the permeable zone, ano the two mixtures are allowed to react. A hard silica gel plug is formed.

Yet another method is disclosed in U.S. Pat. No. 3,805,893 to Sarem ("Sarem"). Sarem discloses the formation of a gelatinous precipitate by injection of small slugs of a dilute aqueous alkaline metal silicate solution, followed by water and then a dilute aqueousssolution of a water soluble material which reacts with the alkali metal silicate to form a precipitate. The precipitate hardens to form a substantially impermeable substance.

U.S. Pat. No. 3,965,986 issed to Christopher ("Christopher") discloses still another method. In Christopher, a slug of fumed colloidal silica and water is injected into a reservoir. This slug has a relatively low viscosity. A surfactant is then injected which forms a gel on contact with the silica slug.

Meyers et al. ("Meyers") disclosed a method for reducing the permeability of a subterranean formation in U.S. Pat. No. 4,676,318. Here an alkali metal silicate was produced by injecting into the formation a solution of alkali metal silicate and a chemical surfactant, and a non-condensible gas. The foam hardens into a substantially impermeable solid. The foam may be used to reduce permeabiiity in areas of the formation which have been steam swept during steam stimulation cycles. Thus, subsequent steam stimulation cycles were directed to uncontacted areas of the formation.

In each of the above methods the gas required for forming the foam was injected into the formation. Therefore what is required is a method wnereby a foam can be generated by a gas released in-situ.

SUMMARY OF THE INVENTION

In the practice of this invention, $CO_2$ is diverted from selected areas of an oil bearing formation by injecting into said formation a foamble gelled solution. This foamable gelled solution comprises transitional metal crosslinked (e.g. Cr, Al, Zr, etc.) aminoplast resin reacted xanthan polymer, cellulose, cellulose derivatives, and other polysaccharide biopolymers having at least one functional group selected from a member of the group consisting of an amine, an amide, a carboxyl, a hydroyyl, or a thiol. The amino resin-polysaccharide biopolymer reaction does not require a catalyst or a particular pH requirement for the preparation of said composition of matter. A chemical surfactant is placed into the gelled solution along with a chemical blowing agent. Said chemical blowing agent is decomposable and tailored for conditions existing in the formation area to be treated.

Subsequently, said solution is injected into a desired area of the formation in an amount sufficient to treat said desired area. The rate of injection is sufficient to allow placement of said solution into the desired area of the formation prior to significant gas release from said chemical blowing agent. When the pH or the temperature of the solution reaches a predetermined level, the chemical blowing agent decomposes and releases gas at a rate and volume sufficient to foam the polymer containing saio surfactant. Foam generated in the desired more permeable area or zone of the formation hardens thereby blocking said desired zone. Once the foam has hardened, a gas flood or a water flood enhanced oil recovery process can be initiated in a less permeable area of the formation.

It is therefore an object of this invention to provide for a chemical blowing agent which is soluble in the injection solution which decomposes in-situ to liberate a gas at a rate and in an amount sufficient to make a foam.

It is another object of this invention to provide for a method whereby the formulation of the foamable injection solution can be modified thus allowing for variable propagation distances prior to foam generation.

It is yet another object of this invention to alleviate injectivity problems by utilizing a single phase solution.

It is still another object of this invention to form a foamed gel in-situ.

It is a yet still further object of this invention to increase the effectiveness of a gel during profile control while reducing the amount of gel utilized.

DESCRIPTION OF THE PREFERRED EMBODIMENT

In flooding operatrons, a fluid, usually water, is injected into the subterranean, oil-bearing formation through an injection well which extends from the surface of the earth down into the formation. A production well also extends into the formation at an offset or horizontal distance from the injection well so that, as the flooding liquid is injected into the formation through the injection well, it displaces the oil towards the prooduction well, from which it may be recovered. Once the oil has been displaced from one swept zone of the formation, an unswept zone may remain which contains additional oil. Often, more than one injection well and more than one production well will be used in order to cover the oil field adequately and maximize recovery. Various arrangements of injection and production wells are used to this end, e.g., linear arrangements to form a line drive, five spot, inverted five spot, seven spot, inverted seven spot, all of which are established in conventional practice.

To remove oil or hycrocarbonaceous fluids remaining in an unswept zone, a solution is injected into previously swept zones which solution contains a melamine formaldehyde ("MF") resin. Said resin is known as an aminoplast or amino resin which comprises a class of tnermosetting resins made by the reactron of an amine with an aldenyde. The resultant resin is reacted with a polysaccharide biopolymer, particularly a xanthan polymer, in an aqueous medium where said polymer has at least one functional group selected from a member of the group consisting of an amine, an amide, a hydroxyl, or a thiol group. Said polysaccharide biopolymer includes among others, cellulose, cellulose derivatives, and xanthan polymers. This reaction can be carried out at ambient conditions, and also under conditions occurring in a subterranean hydrocarbonaceous formation or reservoir in substantially all pH conditions, however a pH of 10 or less is preferred. The material resultant from said reaction can be a gel or a solution which is then crosslinked with a transitional metal sucn as Cr, Al, Zr, to procuce a gel useful to recover hydrocarbonaceous fluids from a formation containing same.

These gels are novel in that they are unaffected by high saline conditions up to about 23 wt. % brine solution, even when said brines contain divalent cations such as Ca(II) and Mg (II), often encountered in said formations. High temperatures encountered in said formations up to about 195° F. do not adversely affect said gels. Said gels can be injected into a formation where said gels "shear" during the injection process and later "reheal" under formation conditions. Gels resultant from said procedure are more thermally stable than the ones without amino resin treatment. A method for making a kindred gel without metals is discussed in U.S. Pat. No. 4,157,322 which issued to Colegrove on June 5, 1979. This patent is hereby incorporated by reference.

Polysaccharide biopolymers, preferably xanthan polymers, having functional groups such as $NH_2$, $—CONH_2$, $COOH$, $—OH$, $—SH$ can react with MF resins. One acceptable xanthan biopolymer is Floco® 4800. This biopolymer can be purchased from Pfizer Inc. Chemicals Div., 235 E. 42nd St., New York, N.Y. 10017. Polymer concentrations range from about 0.1 to about 5.0 wt. percent, preferably about 0.2–3.0 wt. percent. Melamine formaldehyde resin derived as a reaction product of melamine and formaldehyde has a molar ratio of between 1–6. A ratio between 3–6 is commonly used. The methylol group, $—CH_2OH$ is reactrve to varrous functional groups such as $NH_2$, $—CONH_2$, $—OH$, $—SH$ and can also self-condense to form cured resins. MF resins are often methylated fully or partially to modify their reactivity and solubility. All above mentioned aminoresin varieties are useful in this invention. Its preparation is convenient and well documented in preparative polymer manuals.

The MF resin that is utilized in this invention can be a commercial procuct. Included among these melamine-formaldehyde (melamine) resins which are useful in this invention are the partially methylated resins and the hexamethoxymethyl resins (i.e. American Cyanamid's Cymel™ 373, Cymel 370, Cymel 380 and Parez® resins ). The resin, however, has to be one that is soluble or dispersible in an aqueous medium. Other amino resins can also be used. Non-limiting examples of resins whicn can be used are urea-formaldehyde, ethylene and propylene urea formaldehyde, triazone, uran, and glyoxal resins. The amount of MF resins required for polymer modification is in the ratio of 0.1:1 to about 10:1 polymer to amino resins.

The resulting MF reacted xanthan polymer is called MFX polymer. MFX with high amrnoresin ratio are more thermally stable and form gels of higher gel strength. The optimum has to be determined by the field conditions. At high MF/Xanthan ratios, gel may form without Cr crosslinking. This situation should not affect the final gel preparation by Cr or other transitional metal crosslinking.

Final gels resultant from the Cr gelation reaction could be tormed in strong brines up to about 23 wt.% brine solution which may contain at least about 1500 ppm Ca(II) and 500 ppm Mg(II). Such gels are rehealable after being sheared. The amount of Cr used is about 1–10 wt. % based on xanthan polymer. Other transitron metals can also be used. Nonlimiting examples are Al and Zr. Said formed gels were stable as determined by sustained gel integrity and low gel shrinkage at 195° F. for at least three months.

In the preparation of these novel melamine formaloehyde xanthan ("MFX"), Cyanamid's Parez melamine-formaldehyde resin, ano Pfizer's Flocon 4800 xanthan polymer were utilized. The melamine formaloehyde resin and xantnan polymer were mixed in an aqueous solution sufficient to make the desired MFX polymer. These aqueous solutions can comprise fresh water, field brine, sea water, or synthetic brine. Gel forms in about 0.25 of an hour to about 4 hours after the addition of a transitional metal to MFX, preferably Cr (III). The preferred ratio of xanthan to amino-resin is in the range of about 0.1:1 to about 10:1. Ratio of xanthan to transitional metal, preferably Cr, is from about 10:1 to about 100:1.

Cr complexed xanthan gel when used for stratification control is thermally stable up to about 150° F. Metal complexed (Cr) melamine formaldehyde xanthan (MFX) gels are at least 45° F more stable than xanthan-Cr gels. Furthermore, MFX-Cr gels retain the unique rehealing property of xanthan-Cr gels. Rehealing is an important property which allows the preformed gel to experrence mechanical shear (i.e., to be injected into target zones) and then "reheal" to regain its gel structure.

Metallic ions which can be used to crosslink the MFX polymers in solution include zirconium, chromium, antimony and aluminum. The concentration of these transitional metals in said polymer solutions will of course vary depending upon the requirements for the particular application being used and the nature of the formation into which the crosslinked MFX gel is placed. In any event, said metal should be in an amount sufficient to obtain the desired gelling effect. Although the exact amount of the metal required will vary depending on the particular application, it is anticipated that the metals should be included within the gel in amounts of from about 1 wt. % to about 10 wt. % based on xanthan.

Also incorporated into the solution containing the MF or MFX polymer is a chemical surfactant, and a decomposable chemical blowing agent.

Foam-forming surfactants suitable for use in the present invention can comprise substantially any which are capable of being dissolved or dispersed in an aqueous liquid solution containing the nitrogen containing compound and any added activator or inhibitor and remaining substantially inert during the nitrogen-gas-producing reaction of the nitrogen containing compounds. Examples of suitable surfactants comprise nonronic and anionic surfactants, commercially available socium dodecylbenzene sulfonates, e.g., Siponate DS-10 available from American Alcolac Company, mixtures of the Siponate or similar sulfonate surfactants with sulfated polyoxyalkylatec alcohol surfactants, e.g., the NEODOL sulfate surfactants available from Shell Ceemical Company; sulronate-sulrate surfactant mixtures, e.g., those described in the J. Reisberg, G. Smith and J.P. Lawson U.S. Pat. No. 3,508,612; petroleum sulfonates available from Bray Chemical Company; Bryton sulfonates available from Bryton Chemical Company; Petronates TM and Pyronates TM, water-soluble petroleum sulfonates, available from Sonnoborn Division of Witco Chemical Company; fatty acrd and tall oil acid soaps, e.g., Actynol Heads from Arizona Chemical Company; nonionic surfactants, e.g., Triton X100; and the like surfactant materials which are soluble or dispersible in aqueous liquids. These surfactants are disclosed in RE No. 30,935 which issued to Richardson et al on May 18, 1982. This patent is incorporated herein by reference. Cationic surfactants can also be utilized where required due to formation conditions.

The volume of solution injected into the formation depends on the area of the reservoir requiring permeability reduction and on the magnitude of the formatron heterogeneity. For example, if the heterogeneity has been identified as a local high permeability streak or fracture, the volume of solution required may only be 100 to 200 cubic meters. However, if there is generally high permeability in the swept zone, volumes of up to 1,000 cubic meters may be required. As the volume ot solution used should be determined following evaluation of the reservoir, the aforementioned volumes should not be considered limits, but estimates of the average volume required.

The solution may be injected through the wells by which a water or $CO_2$ flood was previously injected. More than one well may be used for injection in order to plug a communication channel. The solution may preferably contact the zones of tne formation which have been previously swept as resistance to flow is lowest in these zones.

The preferred chemical blowing agent to be utilized in tne injection solution is the sodium salt of azodicarboxylic acid. This compound can be formed on site by the treatment of azodicarbonamide with sodium hydroxide and alkali carbonate with resulting ammonia evolution. When heated, this salt liberates nitrogen and carbon dioxide, yet it is very stable at room temperature in basic solutions of a pH greater than 12. Surfactant addition may be reduced or even eliminated in some instances due to surfactant production in-situ. The pH decline from hydroxide consumption will accelerate the foam generation reaction. Because the sodium salt of azodicarboxylic acid is extremely soluble in water, a desired amount of foam can be generated for even the most permeable zones in a formation by incorporating the required amount of said salt into the solution. Toluene sulfonyl hydrazide and p,p'-oxybrs(benzenesultonyl hydrazide) also develop water solubility at high pH, but performance economics lie firmly in favor of the modified azodicarbonamide.

The pH or the solution will also vary depending on how deep into the reservoir the solution must penetrate and how large a volume of foam is desired. An alkaline solution will temporarily retard the decomposition reaction, thereby allowing the solution to be pumped deep into the formation before gas is generated and foaming occurs. A weak acid such as ammonium sulfate, could be present in the solution as a catalyst. The amount or strength of the acid can be increased if faster decomposition is required. Once the solution has penetrated into the formation to tne desired depth, heat from the formation or a decrease in the pH of the solution below 12 causes the sodium salt of azodicarboxylic acid to decompose. This pH decline can be accomplished by $OH^-$ consumption on reservoir mineral surfaces, reaction with acidic components in crude oil (thereby generating surface active materials), or by chemical additives. The blowing agent decomposition reaction is auto-catalytic in that $OH^-$ is consumed, further reducing the pH. The final solution pH would be determined by the inrtial pH, concentration of original blowing agent, chemical consumption by reservoir materials, ano presence of additional weak acids in the formulation. Carbonate and bicarbonate formed in the decomposition typically buffer the final solution pH in the range 9.5 to 11. Upon cecomposition, said azodicarboxylic acid releases nitrogen and carbon dioxide gases sufficient for foaming the MF or MFX solution containing the surfactant. Interacting with the MF or MFX solutron the gases cause a foam to form, which subsequently hardens. The foam will harden into a substantially impermeable solid. Following solidification of the foam, fluid injection can resume. The fluids from subsequent injection will be diverted to areas of the formation which have not been previously contacted.

Where the formation is above the decomposition temperature of the sodium salt of azodicarboxylic acid, water or another cooling fluid can be used to cool the formation to allow the solution to penetrate to the desired depth. Alternatively, a blowing agent with high decomposition temperature can be employed.

As is true for the other components in the solution, the components utilized are formation dependent and wlll vary. The concentration of MF or MFX in the solution will also vary. Saio MF or MFX solution may be injected in a series of slugs. It may be desired to increase the concentration with successive slugs to increase the strength of the foam nearest the welloore, or to inject the desired volume of MF or MFX solution with a subsequent injection of a quantity of solution with a higher concentration of MF/MFX. The foam in the near wellbore area would have sufficient strength to withstand the high injection pressure of subsequent $CO_2$ flooding.

The solution utilized herein to generate a foam for use in a $CO_2$ flood during profile control can also be used for profile control during a waterflood. A waterflood method which can be used herein is disclosed in U.S. Pat. No. 4,458,760 issued to Hurd. This patent is incorporated herein by reference. After completing a water flooding operation, the more permeable zone of a multizone formation will have substantially all hydrocarbonaceous fluids removed. Hydrocarbonaceous fluids still remain in the area of lesser permeability. This novel foamed gel can be used to effectively close a zone of greater permeability. Once the zone of greater permeability is closed, a water flood can be used to remove hydrocarbonaceous fluids from tne zone of lesser permeability.

Although the present invention has been described with preferred embodiments, it is to be understood that modifications and variations may be resorted to without departing from the spirit and scope of this invention, as those skilled in the art will readily understand. Such modifications and variations are considered to be within the purview and scope of the appended claims.

What is claimed is:

1. A method for reducing the permeability in an area of a subterranean formation comprising:
   (a) mixing a gellable composition containing,
   (i) water,
   (ii) about 0.2 to about 5.0 wt.% of a cross linkable polysaccharide biopolymer having at least one functional group selected from a member of the group consisting of an amine, an amide, a hydroxyl, or a thiol group,
   (iii) about 0.02 to about 5.0 wt.% of an aminoplast resin which reinforces said biopolymer thereby causing said polymer to become more thermally stable;
   (iv) sufficient transitional metal ions to form a gel of a size and strength sufficient to reduce permeability in a more permeable zone in said formation;
   (b) introducing thereafter into said composition a chemical surfactant, and an alakli metal salt of azodicarboxylic acid in an amount upon decomposition thereof sufficient to produce a gas sufficient to foam the composition in step (a); and
   (c) injecting the composition from step (b) into the desired area of the formation where said azodicarboxylic acid decomposes thereby generating nitrogen and carbon dioxide gas in an amount sufficient to form a foam which subsequently hardens and reduces the permeability in said desired area.

2. The method as recited in claim 1 where said azodicarboxylic acid salt decomposes by reducing the pH of the solution to less than about 12 or by injecting said solution into a formation having a temperature above about 60° C.

3. The method as recited in claim 1 where the initial pH of said solution is adjusted so that azodicarboxylic acid decomposition kinetics allow a desired penetration distance from an injection site prior to significant gas evolution.

4. The method as recited in claim 1 where said azodicarboxylic acid salt decomposes by reducing the pH to less than about 12 by incorporating a sufficient amount of a weak acid such as ammonium sulfate into said solution so that foaming will occur at a desired depth in the desired area.

5. The method as recited in claim 1 where in step (b) said composition is injected into said formation by at least one injection well.

6. A waterflood method for producing hydrocarbonaceous fluids from a zone of lesser permeability in a formation comprising:
   (a) mixing a gellable composition containing,
   (i) water,
   (ii) about 0.2 to about 5.0 wt.% of a cross linkable polysaccharide biopolymer having at least one functional group selected from a member of the group consisting of an amine, an amide, a hydroxyl, or a thiol group,
   (iii) about 0.02 to about 5.0 wt.% of an aminoplast resin which reinforces said biopolymer thereby causing said polymer to become more thermally stable;
   (iv) sufficient transitional metal ions to form a gel of a size and strength sufficient to reduce permeability in a more permeable zone in said formation;
   (b) introducing thereafter into said composition a chemical surfactant, and an alkali metal salt of azodicarboxylic acid in an amount upon decomposition thereof sufficient to produce a gas sufficient to foam the composition in step (a); and
   (c) injecting the composition from step (b) into the more permeable zone of the formation where said azodicarboxylic acid decomposes thereby generating nitrogen and carbon dioxide gas in an amount sufficient to form a foam which subsequently hardens and reduces the permeability in said more permeable zone; and thereafter
   (d) commencing a water flood oil recovery process in said zone of lesser permeability thereby producing hydrocarbonaceous fluids therefrom.

7. The method as recited in claim 6 where said azodicarboxylic acid salt decomposes by reducing the pH of the solution to less than about 12 or by injecting said solution into a formation having a temperature above about 60° C.

8. The metnod as cited in claim 6 where the initial pH of said solution is adjusted so that azodicarboxylic acid decomposition kinetics allow a desired penetration distance from an injection site prior to significant gas evolution.

9. The metnod as recited in claim 6 where said azodicarboxlic acid salt decomposes by reducing the pH to less than about 12 by incorporating a suffrcient amount of a weak acid such as ammonium sulfate into said solution so that foaming will occur at a desired depth in the more permeable zone.

10. The method as recited in claim 6 where in step (b) composition is injected into said formation by at least one injection well.

11. A carbon dioxide method for producing hydrocarbonaceous fluids from a zone of lesser permeability in a formation comprising:
   (a) mixing a gellable composition containing,
   (i) water,
   (ii) about 0.2 to about 5.0 wt.% of a cross linkable polysaccharide biopolymer having at least one functional group selected from a member of the group consisting of an amine, an amide, a hydroxyl, or a thiol group,
   (iii) about 0.02 to about 5.0 wt.% of an aminoplast resin which reinforces said biopolymer thereby causing said polymer to become more thermally stable;
   (iv) sufficient transitional metal ions to form a gel of a size and strength sufficient to reduce permeability in a more permeable zone in said formation;
   (b) introducing thereafter into said composition a chemical surfactant, and an alkali metal salt of azodicarboxylic acid in an amount upon decomposition thereof sufficient to produce a gas sufficient to foam the composition in step (a); and
   (c) injecting the composition from step (b) into the more permeable zone of the formation where said azodicarboxylic acid decomposes thereby generating nitrogen and carbon dioxide gas in nn amount sufficient to form a foam which subsequently hardens and reduces the permeability in said more permeable zone; and thereafter (d) commencing a carbon dioxide oil recovery process in said zone of lesser permeability thereby producing hydrocarbonaceous fluids therefrom.

12. The method as recited in claim 11 where said azodicarboxylic acid salt decomposes by reducing the pH of the solution to less than about 12 or by injecting said solution into a formation having a temperature above about 60° C.

13. The method as cited in claim 11 where the initial pH of said solution is adjusted so that azodicarboxylic acid decomposition kinetics allow a desired penetration distance from an injection site prior to significant gas evolution.

14. The method as recited in claim 11 where said azodicarboxylic acid salt decomposes by reducing the pH to less than about 12 by incorporatrng a sufficient amount of a weak acid such as ammonium sulfate into said solution so that foaming will occur at a oesired depth in the more permeable zone.

15. The method as recited in claim 11 where in step b) said composition is injected into said formation by at least one injection well.

* * * * *

UNITED STATES PATENT AND TRADEMARK OFFICE
CERTIFICATE OF CORRECTION

PATENT NO. : 4,830,108

DATED : May 16, 1989

INVENTOR(S) : Randy D. Hazlett et al

It is certified that error appears in the above-identified patent and that said Letters Patent is hereby corrected as shown below:

Col. 1, line 23, "methoos" should read --methods--.
Col. 2, line 5, "foamble" should read --foamable--.
Col. 2, line 12, "hydroyyl" should read --hydroxyl--.
Col. 2, line 29, "saio" should read --said--.
Col. 2, line 61, "proouction" should read --production--.
Col. 3, line 9, "tnermosetting" should read --thermosetting--.
Col. 3, line 9, "reactron" should read --reaction--.
Col. 3, line 10, "aldenyde" should read --aldehyde--.
Col. 3, line 51, "reactrve" should read --reactive--.
Col. 3, line 60, "procuct" should read --product--.
Col. 4, line 18, "transitron" should read --transition--.
Col. 4, line 23, "formaloe" should read --formalde--.
Col. 4, line 25, "ano" should read --and--.
Col. 4, line 26, "formaloehyde" should read --formaldehyde--.
Col. 4, line 27, "xantnan" should read --xanthan--.
Col. 4, line 44, "experrence" should read --experience--.
Col. 5, line 3, "nonronic" should read --nonionic--.
Col. 5, line 4, "socium" should read --sodium--.
Col. 5, line 8, "polyoxyalkylatec" should read --polyoxyalkylated--.
Col. 5, line 9, "Ceemical" should read --Chemical--.
Col. 5, line 10, "sulronate-sulrate" should read --sulfonate-sulfate--.
Col. 5, line 17, "acrd" should read --acid--.
Col. 5, line 28, "formatron" should read --formation--.
Col. 5, line 34, "ot" should read --of--.
Col. 5, line 43, "tne" should read --the--.
Col. 5, line 47, "tne" should read --the--.
Col. 5, line 62, "p,p'-oxybrs(benzenesultonyl" should read
    --p,p'-oxybis(benzenesulfonyl--.
Col. 6, line 8, "tne" should read --the--.
Col. 6, line 18, "inrtial" should read --initial--.
Col. 6, line 20, "ano" should read --and--.
Col. 6, line 23, "cecomposition" should read --decomposition--.
Col. 6, line 27, "solutron" should read --solution--.

UNITED STATES PATENT AND TRADEMARK OFFICE
CERTIFICATE OF CORRECTION

PATENT NO. : 4,830,108

DATED : May 16, 1989

Page 2 of 2

INVENTOR(S) : Randy D. Hazlett et al

It is certified that error appears in the above-identified patent and that said Letters Patent is hereby corrected as shown below:

```
Column 6, line 42, "Saio" should read --Said--.
Col. 6, line 45, "welloore" should read --wellbore--.
Col. 7, line 25, "alakli" should read --alkali--.
Col. 8, line 25, "metnod" should read --method--.
Col. 8, line 30, "metnod" should read --method--.
Col. 8, line 32, "suffrcient" should read --sufficient--.
Col. 8, line 65, "nn" should read --an--.
Col. 10, line 7, "oesired" should read --desired--.
```

Signed and Sealed this

Twenty-third Day of June, 1992

Attest:

DOUGLAS B. COMER

Attesting Officer

Acting Commissioner of Patents and Trademarks